May 26, 1936.  S. VORECH ET AL  2,041,884

BRAKE MECHANISM

Filed June 2, 1932   2 Sheets-Sheet 1

INVENTORS
STEPHEN VORECH,
STEPHEN JOHNSON,
BY
ATTORNEY

Fig.5.

Patented May 26, 1936

2,041,884

UNITED STATES PATENT OFFICE 2,041,884

BRAKE MECHANISM

Stephen Vorech and Stephen Johnson, Jr., Pittsburgh, Pa., assignors to Bendix Westinghouse Automotive Air Brake Company, Pittsburgh, Pa., a corporation of Delaware Application June 2, 1932, Serial No. 614,988

4 Claims. (Cl. 303—13)

The present invention relates to brakes and more particularly to fluid-pressure actuated systems for operating the brakes of motor or other vehicles.

An object of the present invention is to provide a fluid-pressure braking system in which the brakes may be actuated by any one of a plurality of pressure systems.

Another object of the invention is to provide a fluid-pressure braking system comprising a plurality of pressure systems for operating the brakes, whereby on failure of one such system the other may be operated to actuate the brakes.

A further object of the invention is to provide in a fluid-pressure braking system, an auxiliary brake-operating system together with means controlled by both of said systems whereby one of said systems is shut off when the other is operated.

A still further object is to provide a fluid-pressure braking system which will be so arranged and designed as to give brake application even after failure of parts of the system.

A still further object is to provide a fluid-pressure braking system which will include a plurality of manually-operable control members, each of which is operable in a separate system, to effect application of the brakes.

A still further object is to provide a fluid-pressure braking system comprising an auxiliary system for effecting brake application, said braking system and said auxiliary system being so designed as to include a minimum number of parts and a minimum amount of piping.

A still further object of the invention is to provide a braking system in which manual operation of the brakes may be had on failure of pneumatic means.

A still further object of the invention is to provide a braking system in which the brakes may be applied by either of a plurality of pressure-operated means, or alternately, may be operated by manual means on failure of the pressure-operated means.

Other objects and features of novelty of the invention will appear more clearly from the following detailed description taken in connection with the accompanying drawings, which illustrate one embodiment of the invention. It is to be expressly understood, however, that the drawings are for purposes of illustration only and are not designed as a definition of the limits of the invention, reference being had for this purpose to the appended claims.

Referring to the drawings:

Fig. 3 is a view showing a modified form of braking system according to the present invention.

Figure 1:
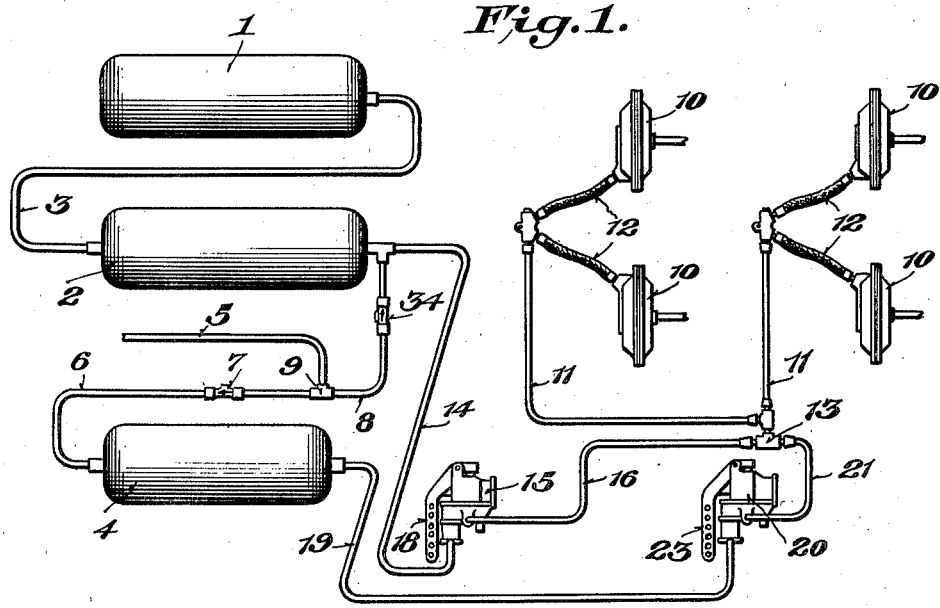
Fig. 1 is a view showing a braking system according to the present invention.

Referring to the drawings, and more particularly to Fig. 1 thereof, reservoirs 1 and 2 are provided for the storage of a fluid under pressure such as compressed air, the same being interconnected at all times through a pipe 3. An auxiliary reservoir 4 is also provided, the same being adapted to be supplied with fluid under pressure from a compressor (not shown) through a pipe 5, connected to the compressor, a T-coupling 9, and a pipe 6 which includes a one-way check valve 7 which allows flow of fluid to reservoir 4 from the compressor and pipe 5 but not in the opposite direction. Reservoirs 1 and 2 are also fed from the compressor and pipe 5 through a pipe 8, the same including a one-way check valve 34 allowing flow of fluid from the compressor and pipe 5 to reservoirs 1 and 2 but not in the opposite direction, said pipe 8 being connected to pipe 5 through the T-coupling 9. Brake cylinders 10 are provided, the same being adapted to be supplied with fluid under pressure through pipes 11 and flexible couplings 12, the pipes 11 being connected, as shown, to the central passage 35 of a double check valve 13, the same being more fully disclosed in Fig. 2 of the drawings.

Means are provided for connecting the interconnected reservoirs 1, 2 to brake cylinders 10, such means comprising pipe 14, connected at its one end to one of said reservoirs, and at its other end to a brake valve device 15, the construction of which forms no part of the present invention. A pipe 16 is connected at its one end to brake valve 15 and at its other end to a connecting member 17 on double check valve 13. Brake valve 15 is provided, as is usual, with a manually-operable means 18 for operating said valve to establish communication between pipe 14 and pipe 16.

Means are provided for establishing communication between isolated reservoir 4 and brake cylinders 10, such means comprising a pipe 19, connected at its one end to reservoir 4 and at its other end to a second brake valve device 20. A pipe 21 is provided, the same being connected at one end to brake valve device 20 and at its other end to a connecting member 22 provided on double check valve 13. Brake valve device 20 is of usual design and construction, and specifically forms no part of the present invention. As is usual, this valve device is provided with manually-operable means 23 for operating said valve to establish communication between pipe 19 and pipe 21.

Figure 2:
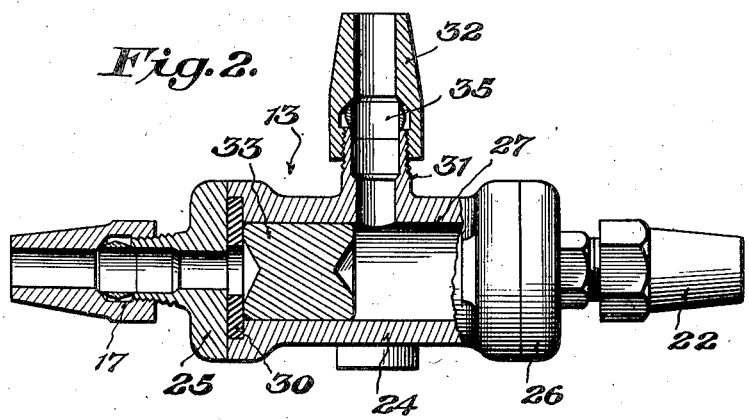
Fig. 2 is a view, partly in section, of a valve device, which is shown in its operative relation to other parts of the invention in Fig. 1.

Referring now more particularly to Fig. 2 wherein is fully disclosed the double check valve device 13, referred to above, it will be seen that the same comprises a cylindrical body member 24, said body member having a longitudinally-extending cylindrical bore 27 therethrough. End members 25 and 26 are provided, the same being attached by any suitable means to the ends of said body member, said end members being provided with passages extending therethrough, the same communicating directly with the tubular bore 27 in body member 24 but being of smaller diameter. Connecting members 17 and 22 are preferably screw-threaded to end members 25 and 26 and, as heretofore stated, provide means for attaching pipes 16 and 21 to the double check valve 13. Annular resilient seats 30 are disposed in interiorly-formed annular offsets in body member 24, only one of said seats being disclosed in Fig. 2. Formed on the body member 24 at the middle of its longitudinal length and extending radially thereof is formed an attaching lug 31, the same being preferably formed integrally with body member 24, and having a bore 35 extending therethrough which is in constant open communication with cylindrial bore 27. Attaching means 32 are preferably screw-threaded to lug 31 and such attaching means are adapted to be connected to the pipes 11 leading to the brake cylinders 10, whereby said brake cylinders are in constant, open communication with the cylindrical bore 27. Slidably disposed in the bore 27 is a piston 33, the same being of such a length that when it is at either end of the bore 27 and engaging one of the annular seat rings 30, the passage through the lug 31 and fitting 32 will be open to the bore 27.

From the above, it will be obvious that if a fluid under pressure is admitted through pipe 21 and fitting 22, the pipe 16 and fitting 17 being connected to a lower pressure, the piston will be moved to the left, as viewed in Fig. 2 and the pipe 21 will therefore be in open communication with the brake cylinders 10 through fitting 22, bore 27, lug 31, fitting 32, pipes 11 and flexible connections 12.

For the purposes of describing the invention it may be assumed that manually-operable member 18 of brake valve 15 is adapted to be operated by a foot-pedal, while manually-operable member 23 of brake valve 20 is adapted to be operated by the usual emergency hand-lever of a vehicle, although other means of operating these members may be provided or the above methods of operation may be interchanged.

In operation fluid under pressure is supplied by a compressor to reservoirs 1, 2 and 4 through pipe 5 and past check valves 7 and 34. Such check valves prevent fluid under pressure in the reservoirs from returning to the compressor or equalizing with the other reservoir. If manually-operable lever 18 of brake valve 15 be operated at this time to establish connection between pipe 14 and pipe 16 fluid under pressure will flow from interconnected reservoirs 1, 2 through pipe 14, brake valve 15, pipe 16, to double check valve 13 through connecting member 17 and end member 25. As there is no pressure in pipe 21 due to the fact that this pipe is connected to atmosphere through brake valve 20, piston 33 in double check valve 13 will be moved to the right as viewed in Fig. 2 and communication will be established between pipe 16 and pipes 11, thereby supplying fluid under pressure to brake cylinders 10 through flexible connections 12.

If it is desired to operate the brakes by means of the hand-operated emergency brake lever, the manually-operable member 23 of brake valve 20, which is connected to the said emergency lever, is operated, thereby establishing connection between pipe 19 and pipe 21. At this time fluid under pressure will flow from reservoir 4 through pipe 19, brake valve 20, and pipe 21 to the double check valve 13 where pressure entering bore 27 through connecting member 22 and end member 26 will force piston 33 to the left as viewed in Fig. 2, thereby allowing fluid under pressure in pipe 21 to flow to brake cylinders 10 through pipes 11 and flexible connections 12. Piston 33 may be easily moved to the left in the above operation by reason of the fact that the left end of bore 27 is connected to atmosphere through pipe 16 and brake valve 15 which is in inoperative position.

It will be evident from the above that a simple and effective means has been provided for supplying fluid pressure to the brake cylinders of a vehicle by either of two pressure systems. Obviously if part of one of the systems should fail the brakes might still be applied by means of the other system, the check valves 7 and 34 and the double check valve 13 preventing loss of fluid under pressure on breakage of parts of one system.

Referring now particularly to Fig. 3 of the drawings, it will be seen that a braking system has been provided wherein the brakes may be operated by either of a plurality of fluid-pressure operated means, or, on failure of such pneumatic means, may be operated by manual means. In the drawings the numeral 40 represents the brake cylinders of a vehicle, the same being operable to rotate suitable brake devices or members such as cam-shafts 42 through push-rods 41 and slack adjusters 43. Brake cylinders 40 are connected, through piping 44 to a brake valve (not shown) which may preferably be operated by a foot pedal (also not shown).

A second set of brake-operating cylinders is provided, such cylinders being illustrated at 45 and including push-rods 46 which are connected at their outer ends to the upper ends of levers 47, the same being attached at their centers to a cross-shaft 48. The lower ends of levers 47 are attached by means of rods 49 to suitable lever arms 50 connected to slack adjusters 43 and cam-shafts 42. It will be observed that lost motion connections 51 have been provided between lever arms 50 and rods 49. It will also be observed that when air is supplied to cylinders 40 to operate the brakes, cam-shafts 42 and lever-arms 50 will be rotated in a clockwise direction, and such rotation will not in any way affect rods 49 and attached parts due to the lost motion connections 51 between levers 50 and rods 49. However, the lost motion connections are so disposed that any brake-applying effort on rods 49 will immediately be transmitted to levers 50 and cam-shaft 42 as there is no lost motion in this direction.

Means are provided for supplying fluid under pressure to brake cylinders 45, such means comprising the brake valve 52, the same being connected to brake cylinders 45 through piping 53, and to a reservoir means through piping 54. It should be noted that the reservoir means connected to brake valve device 52 is isolated from the reservoir means connected to the brake valve device supplying the brake cylinders 40. The arrangement may be identical with that shown in Fig. 1. Brake cylinders 45 are normally connected to the atmosphere through piping 53 and brake valve 52. Manually-operable lever 55 is provided for operating brake valve 52, the same being operable, by the usual hand emergency lever (not shown) of the vehicle, through connecting rod 56, which is connected at point 57 to lever 55. Lever 55 is also connected, at point 57, to one end of a connecting rod 58, the other end of which is connected, through a lost motion device 59 to a lever 60, the same being carried by, and connected to the cross-shaft 48. The lost motion connection 59 is so arranged that on operation of lever 55 sufficient to effect operation of the brakes through brake valve 52 and brake cylinders 45, the lever 60 will not be moved as the lost motion device 59 will not be entirely taken up.

The operation of the device is as follows:

Operation of the foot pedal (not shown) operates the foot-pedal controlled brake valve (not shown) to supply fluid under pressure to brake cylinders 40 through pipes 44, the brake cylinders 40 then rotating cam-shafts 42 in a clockwise direction through push-rods 41 and slack adjusters 43. Due to the lost motion connection between levers 50 and rods 49, no movement of rods 49 will occur on such actuation of the cam-shafts 42. If it is desired to operate the brakes by means of the hand emergency lever (not shown) such lever is operated to exert a pull on rod 56 and lever 55, thereby operating brake valve 52 to supply fluid under pressure to brake cylinders 45 through pipe 54, brake valve 52, and piping 53. Such actuation of brake cylinders 45 will rotate the cam shafts 42 in a clockwise direction through push-rods 46, levers 47, and connecting rods 49. As pointed out hereinbefore, the lost motion connection 51 is so arranged that it has no effect when cam-shafts 42 are operated by connecting rods 49, the connection in this case being rigid and instantaneous. When rod 56 and lever 55 are operated, as described above, by the hand emergency lever, connecting rod 58 will move to the left due to its connection at point 57 with lever 55, such movement acting to partially take up the lost motion 59. However, before such lost motion is entirely taken up, brake valve 52 will have been operated by lever 55 and fluid under pressure will operate in cylinder 45 to rotate cross-shaft 48 in a clockwise direction through push-rods 46 and levers 47. Accordingly such rotation of the cross-shaft 48 and lever 60 will be by air pressure alone and no manual force will be transmitted to cross-shaft 48 through rod 58 and lever 60.

In the event of failure of either the foot-pedal or the hand-lever operated device, it will be obvious that the other of such devices will not be affected by such failure and an air application of the brakes may be had. In the event of failure of both of the air systems, it will be obvious that manual operation of the brakes may be had by means of the hand lever, operating through rod 56, rod 58, lever 60, cross-shaft 48, levers 47, rods 49, levers 50, slack adjusters 43 and cam-shafts 42.

While there has been shown and described a single embodiment of the present invention, it is to be understood that the invention is not in any way limited thereby, and that different systems and modifications of the parts thereof may be employed without departing from the spirit of the invention, reference being had for the limits of said invention to the appended claims.

What is claimed is:

1. In a vehicle braking system, the combination with brake operating members, manually controlled fluid pressure means for operating said members, and separate pedal controlled fluid-pressure means for operating said members independently of said manually controlled fluid-pressure means, one of said means including connections to said members for operating the latter mechanically and independently of said fluid pressure means in the event of failure of the latter.

2. A fluid-pressure braking system comprising a pair of brake operating members, pedal controlled fluid-pressure means for operating said members, a cross shaft, connections including lost motion devices between said cross shaft and members, fluid-pressure means for operating said cross shaft, manual means for controlling said last named fluid-pressure means, and connections including an overrunning connection between said manual means and said cross shaft for operating said brake operating members mechanically in the event of failure of either of said fluid-pressure means.

3. A braking system comprising a brake operating device, fluid-pressure means for operating said device, a separate fluid-pressure means connected to said brake operating device through a lost motion device, a manually-operable means for controlling said separate fluid-pressure means, and a connection between said manually-operable means and said brake operating device including a second lost motion device.

4. A fluid-pressure braking system for vehicle brake devices comprising a pair of sets of fluid-pressure operated chambers, means connecting one set of chambers with said brake devices, means including overrunning connections for connecting the other set of chambers with said brake devices, pedal-operated means for controlling one set of chambers to operate the brake devices, manually-operated means separate and independent of said pedal-operated means for controlling the other set of chambers to operate the brake devices, and connections between said brake devices and one of said means to operate the brake devices mechanically in the event of failure of said sets of chambers.

STEPHEN VORECH.
STEPHEN JOHNSON, JR.